W. H. LITTLE.
SHAFT COUPLING.
APPLICATION FILED DEC. 16, 1912.
1,091,520.
Patented Mar. 31, 1914.
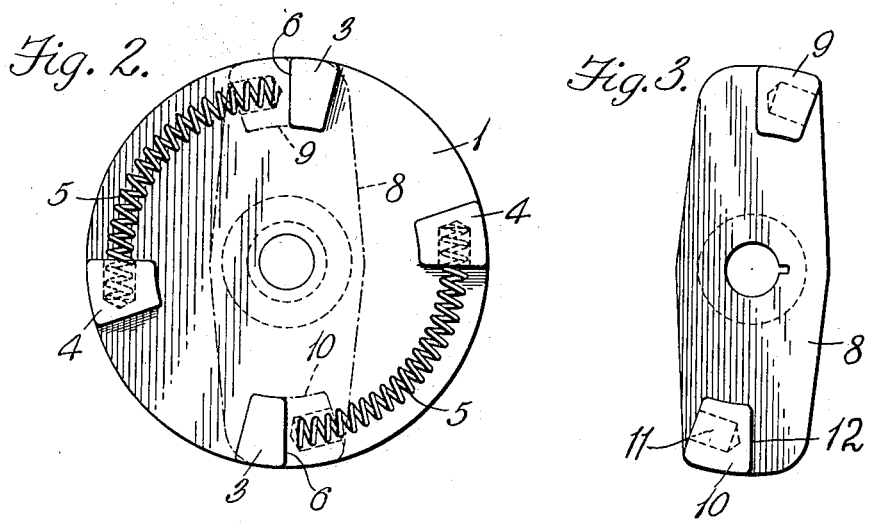
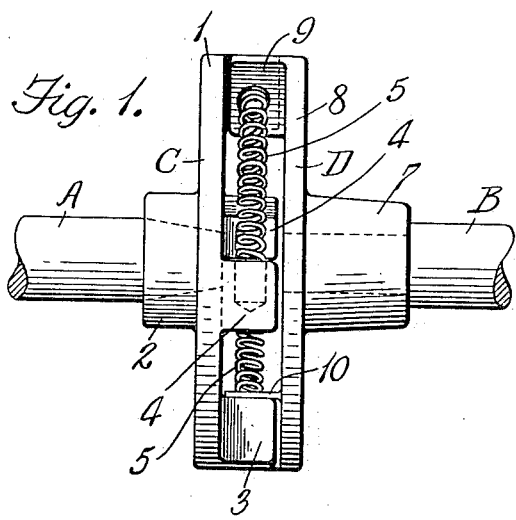
Witnesses
Chas. W. Stauffiger
Genevieve E. McGrann
Inventor
William H. Little.
By
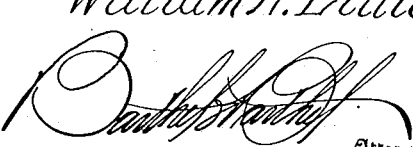
Attorneys

UNITED STATES PATENT OFFICE.

WILLIAM H. LITTLE, OF DETROIT, MICHIGAN.

SHAFT-COUPLING.

1,091,520.  Specification of Letters Patent.  Patented Mar. 31, 1914.

Application filed December 16, 1912. Serial No. 736,918.

*To all whom it may concern:*

Be it known that I, WILLIAM H. LITTLE, a citizen of the United States of America, residing at Detroit, in the county of Wayne and State of Michigan, have invented certain new and useful Improvements in Shaft-Couplings, of which the following is a specification, reference being had therein to the accompanying drawings.

In coupling the adjacent ends of shafts for transmitting motion, it is often found to be difficult to accurately aline the shafts and hold them in alinement.

The object of this invention is to provide a coupling which is so constructed that a wide range of accuracy in the alinement of such shafts is provided for and the members secured to the adjacent ends of the shafts so arranged and constructed as to provide an interlocking engagement between them and a positive drive.

A further object is to provide means for preventing the noise and wear caused by the play between the parts and to provide certain other new and useful features in the construction and arrangement, the invention consisting in the matters hereinafter set forth and more particularly pointed out in the appended claims reference being had to the accompanying drawing in which—

Figure 1 is a side elevation of a coupling embodying the invention; Fig. 2 is an end view of one of the coupling members; and Fig. 3 a similar view of the adjacent face of the other member.

A, B, represent the shafts to be coupled and to the adjacent ends of which the coupling members C, D, are secured respectively.

The coupling member C comprises a disk 1 of desired diameter having an axial hub portion 2 by means of which it is secured to the end of the shaft A in any suitable manner. The disk is formed with lugs 3 projecting laterally from its face toward the opposing member D and arranged at diametrically opposite points of the periphery of the disk. The disk is also formed with similarly arranged lugs 4 each formed with a bore extending inward from one side of the lug to receive the end of a coiled spring 5. The lugs 3 are each formed with a flat side face 6 and these faces extend in the plane of a diametral line of the disk with one of the lugs arranged at one side of said plane and the other lug at the opposite side thereof.

The coupling member D is formed with a hub 7 by means of which it is secured in any suitable manner to the shaft B and formed integral with this hub is a plate 8 which forms flat arms extending laterally in opposite directions from the hub. Formed integral with and projecting laterally from the face of the plate 8 toward the adjacent face of the member C are lugs 9 and 10 arranged at the extreme outer ends of the arms of the plate and each provided with a bore 11 extending inward from one side and forming sockets to receive the ends of the coiled springs 5. The opposite sides 12 of the lugs 9 and 10 are formed flat and extend in the plane of the longitudinal diametral line of the arm of the plate.

When the coupling members are in coupled position as shown in Fig. 1, the faces 12 of the lugs 9 and 10 engage the faces 6 of the lugs 3 on the member C and are yieldingly held in such engagement by the action of the springs 5. The engagement of the lugs on one member with those on the other give a positive drive and as the contact faces of the lugs on both members are straight an accurate alinement of the shafts is not necessary in order to bring the lugs into proper engagement and motion will be transmitted from one shaft to the other without any wear or binding in the shaft bearings whether the shafts are in alinement or not. The coiled springs interposed between the lugs on one member and those on the other will exert a force to hold one shaft turned with the lugs of its coupling member in contact with the corresponding lugs on the other member and thus all noise by the engagement of the lugs is prevented and as the shafts will be arranged to revolve in one direction only, said springs will serve the purpose only of holding the lugs in contact and preventing rattling.

Obviously changes may be made in the construction and arrangement of parts without departing from the spirit of my invention and I do not limit myself to the particular form or arrangement shown.

Having thus fully described my invention what I claim is:—

A shaft coupling comprising opposed coupling members adapted to be secured to the opposed ends of shafts and to be independently supported solely thereby, one of said members being formed with a disk having two pairs of integral diametrically opposed arranged lugs extending laterally from one face of the disk at its periphery toward the other coupling member, the lugs of one pair being each formed with a contact face at one side with the contact face of one lug in the same plane as the contact face of the other lug, and the lugs of the other pair having sides in a common plane provided with bores to form seats for coiled springs; and the other coupling member being formed with integral laterally extending arms provided with fixed lugs at their outer ends projecting laterally therefrom toward the other coupling member and provided with contact faces at one side in a common plane to engage the contact faces of the adjacent lugs on the disk and formed with bores in their opposite sides to provide seats for coiled springs; and coiled springs seated at one end in said bores in the lugs on one member and at their opposite ends in the bores of the lugs on the other member to hold said members turned relatively with the contact faces of the lugs of one member in engagement with the contact faces of the lugs on the other member, said lugs corresponding in depth and forming the sole means for transmitting motion from one shaft to the other.

In testimony whereof I affix my signature in presence of two witnesses.

WILLIAM H. LITTLE.

Witnesses:
W. W. WRAY,
E. M. FOSTER.